(12) United States Patent
Abe et al.

(10) Patent No.: US 8,349,957 B2
(45) Date of Patent: Jan. 8, 2013

(54) POLYOLEFIN RESIN COMPOSITION AND USES THEREOF

(75) Inventors: Shota Abe, Ichihara (JP); Atsushi Morita, Chiba (JP); Kazuoto Sugiyama, Ichihara (JP); Mineo Kubo, Iwakuni (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 0 days.

(21) Appl. No.: 13/127,723

(22) PCT Filed: Nov. 18, 2009

(86) PCT No.: PCT/JP2009/069557
§ 371 (c)(1),
(2), (4) Date: May 5, 2011

(87) PCT Pub. No.: WO2010/058789
PCT Pub. Date: May 27, 2010

(65) Prior Publication Data
US 2011/0207840 A1 Aug. 25, 2011

(30) Foreign Application Priority Data
Nov. 19, 2008 (JP) .................................. 2008-295829

(51) Int. Cl.
*C08F 8/00* (2006.01)
*C08L 23/00* (2006.01)

(52) U.S. Cl. ........................................ 525/191; 525/240

(58) Field of Classification Search .................. 525/191, 525/240
See application file for complete search history.

(56) References Cited

U.S. PATENT DOCUMENTS
2004/0039115 A1 2/2004 Ishida
2008/0057389 A1* 3/2008 Kono et al. .................. 429/144

FOREIGN PATENT DOCUMENTS

| CN | 1899805 A | 1/2007 |
|---|---|---|
| JP | 63-230751 A | 9/1988 |
| JP | 4-126352 A | 4/1992 |
| JP | 5-234578 A | 9/1993 |
| JP | 7-60084 A | 3/1995 |
| JP | 11-240970 A | 9/1999 |
| JP | 2000-143867 A | 5/2000 |
| JP | 2001-122975 A | 5/2001 |
| JP | 2003-105022 A | 4/2003 |
| JP | 2004-161899 A | 6/2004 |
| JP | 2004-196870 A | 7/2004 |
| JP | 2007-23171 A | 2/2007 |
| WO | WO 03/022920 A1 | 3/2003 |

OTHER PUBLICATIONS

International Search Report (PCT/ISA/210) issued on Jan. 26, 2010, by Japanese Patent Office as the International Searching Authority for International Application No. PCT/JP2009/069557.
"Bulletin of the American Physical Society," 1956, Series 2, vol. 1, No. 3, p. 123, the American Physical Society, Columbia University, New York, NY.
Office Action issued in corresponding Chinese Patent Application No. 200980145100.0 dated Aug. 3, 2012.

* cited by examiner

*Primary Examiner* — Nathan M Nutter
(74) *Attorney, Agent, or Firm* — Buchanan Ingersoll & Rooney PC

(57) ABSTRACT

The present invention provides a polyolefin resin composition which is excellent in mechanical properties and dimensional stability and is particularly excellent in heat resistance, a film which is excellent in mechanical properties, dimensional stability and heat resistance because it is obtained from the polyolefin resin composition and which is particularly excellent in meltdown properties, a macroporous membrane which is excellent in permeability and shutdown properties in addition to the above properties, and uses thereof. The polyolefin resin composition of the present invention (C) comprises 85 to 50% by mass of ultrahigh-molecular weight polyethylene (A) having a specific intrinsic viscosity and 15 to 50% by mass of a polymer (B) containing a repeating unit derived from 4-methyl-1-pentene, in 100% by mass of the polyolefin resin composition (C).

20 Claims, 3 Drawing Sheets

[Fig. 1]
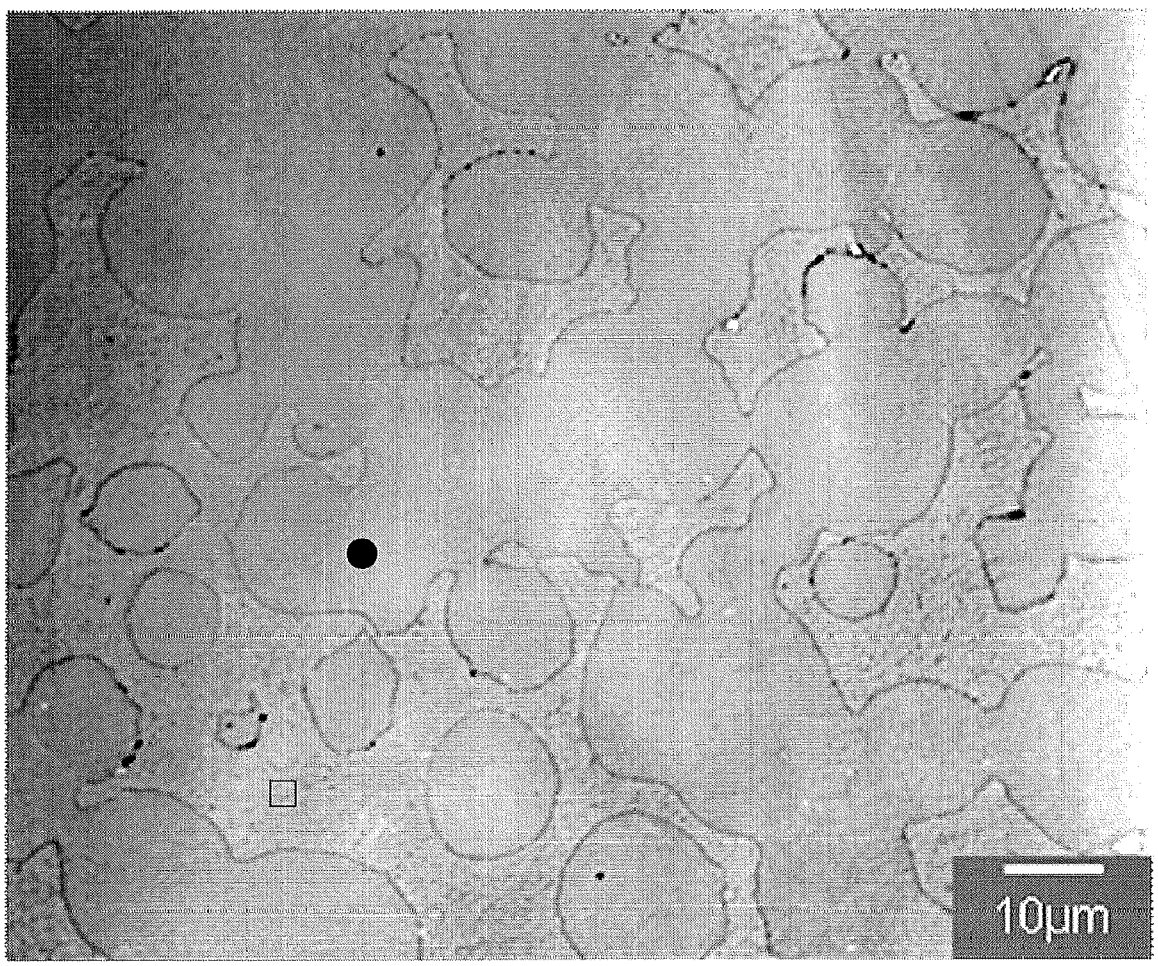

[Fig. 2]
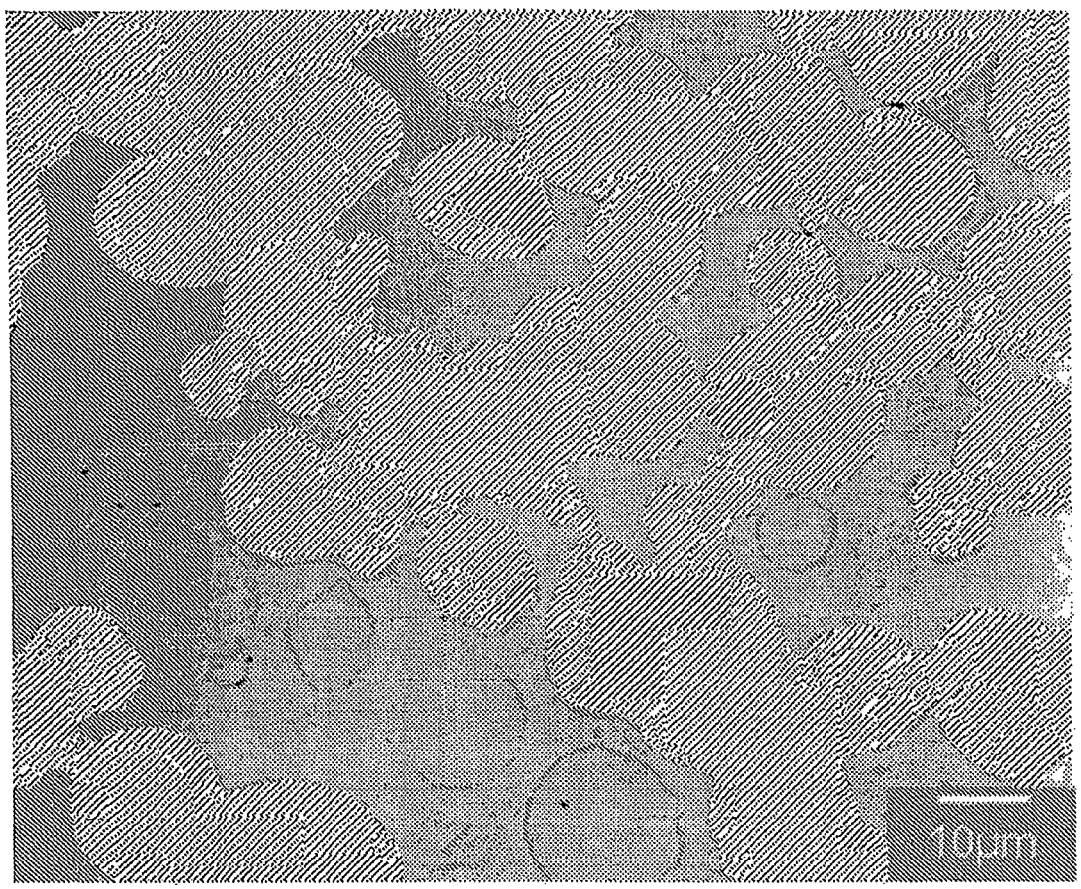

[Fig. 3]
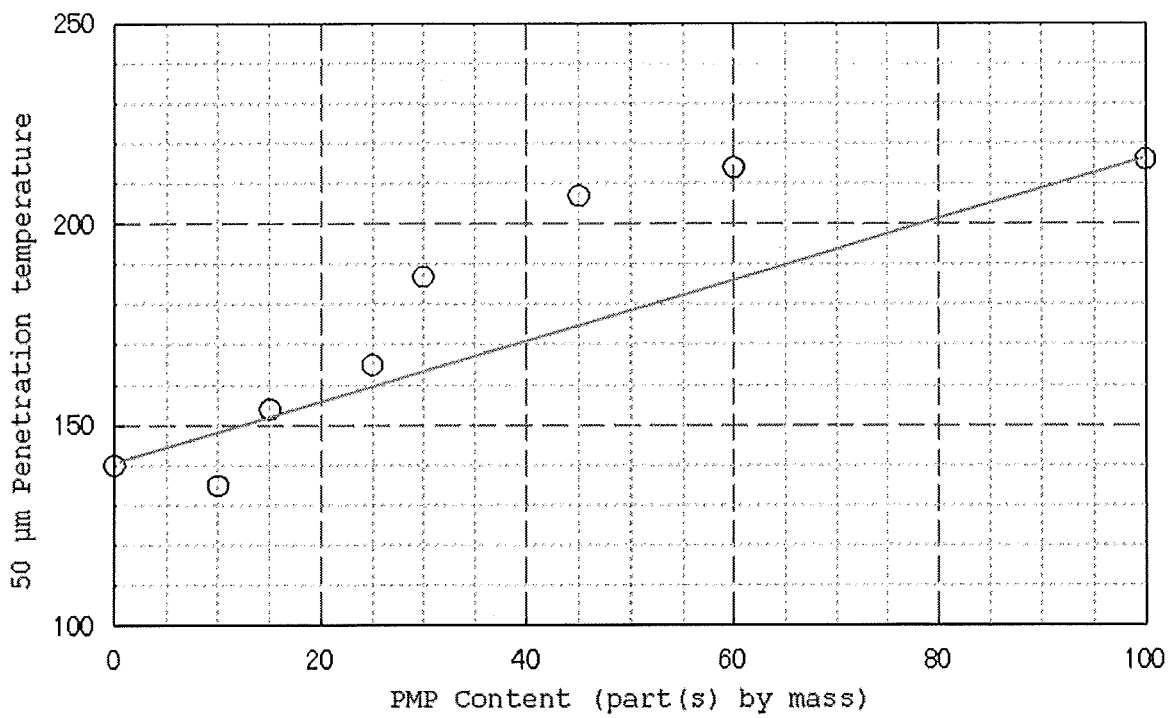

US 8,349,957 B2

POLYOLEFIN RESIN COMPOSITION AND USES THEREOF

TECHNICAL FIELD

The present invention relates to a polyolefin resin composition comprising ultrahigh-molecular weight polyethylene and a polymer containing a repeating unit derived from 4-methyl-1-pentene, and uses thereof. More particularly, the present invention relates to a polyolefin resin composition which is excellent in mechanical properties and dimensional stability and is particularly excellent in heat resistance, a film which is made of the resin composition, is excellent in mechanical properties, dimensional stability and heat resistance and is particularly excellent in meltdown properties, a microporous membrane which is excellent in permeability and shutdown properties in addition to the above properties, and uses thereof.

BACKGROUND ART

Polyolefin macroporous membranes have been widely used not only as battery separators used for lithium secondary batteries, nickel-hydrogen batteries, nickel-cadmium batteries, polymer batteries, etc. but also as electrolytic capacitor separators, various filters, such as reverse osmosis filtration membrane, ultrafiltration membrane and microfiltration membrane, moisture-permeable waterproof clothes, medical materials, etc.

When a polyolefin microporous membrane is used as a battery separator, particularly as a lithium ion battery separator, its performance deeply relates to battery properties, battery productivity and battery safety. On that account, for the polyolefin microporous membrane, excellent mechanical properties, heat resistance, permeability, dimensional stability, shutdown properties, meltdown properties, etc. are required. For example, if a polyolefin microporous membrane having low mechanical strength is used as a battery separator, voltage of the battery is sometimes lowered because of short circuit of an electrode.

A microporous membrane made of polyethylene alone generally has low mechanical strength, and in order to improve mechanical strength, a microporous membrane comprising ultrahigh-molecular weight polyethylene has been proposed. For example, a separator made of a composition containing ultrahigh-molecular weight polyolefin as an essential component has been proposed in a patent literature 1, a patent literature 2 or the like.

As for the properties of separators, however, not only mechanical strength and permeability but also safety has been strictly regarded as important recently. In particular, an electrode of a lithium ion battery repeatedly undergoes expansion and shrinkage accompanying electric charge and discharge. In this case, shutdown properties to rapidly shut down the battery circuit when high electric current flows because of external short circuit or the like are required. As a separator of a lithium ion battery, a polyethylene microporous membrane produced by a stretching pore-opening method or a phase separation method is practically used at present, and the reason is that the membrane is melted at a relatively low temperature by heat generated by the short-circuit current to close the micropores, whereby the battery circuit can be shut down, and the temperature rise after closure of the micropores can be inhibited.

For the microporous membrane of the lithium ion battery, however, not only such a function to close micropores at a relatively low temperature but also an ability to retain the shape when the temperature is raised to a high temperature is important, and if the shape is not retained, a dangerous state of direct contact of electrodes, that is, meltdown may be brought about. This meltdown temperature of the battery separator made of polyethylene cannot be said to be satisfactory, because the separator has a low melting point. In order to improve the meltdown properties, a separator composed of polyethylene and polypropylene has been proposed in a patent literature 3. As for the ratio between the polyethylene and the polypropylene, this literature refers to a polyethylene content of not more than 20 parts by mass. However, the meltdown temperature of this microporous membrane is not particularly high, and it cannot be said that the heat resistance of the polyolefin microporous membrane is satisfactory. In a patent literature 4, a microporous membrane composed of polyethylene and a non-polyethylene-based thermoplastic resin has been proposed. As the polyethylene, ultrahigh-molecular weight polyethylene has been proposed, but the substance used in this literature is a polyethylene composition (mixture of ultrahigh-molecular weight polyethylene and high-density polyethylene) containing high-density polyethylene as a main component, and its molecular weight is not high. On that account, it cannot be said that the microporous membrane obtained from the composition has strength enough to stand its use, and besides, the heat resistance is not sufficient either. In a patent literature 5, a polyolefin microporous membrane made of a mixture of polyethylene and polymethylpentene has been proposed. In this literature, it is disclosed that in order to produce a polyolefin microporous membrane, a mixture (polyolefin resin) of high-density polyethylene and polymethylpentene is melt kneaded and then stretched at a specific preset temperature. The resulting microporous membrane, however, is insufficient in points of strength and heat resistance, similarly to the patent literature 4. In this literature, it is further described that in the case where ultrahigh-molecular weight polyethylene is used, a fraction having a molecular weight of not more than 1,000,000 must be not less than 80% by weight based on the whole system in order to obtain a homogeneous composition. In this literature, however, it is not disclosed at all that the performance of the microporous membrane can be enhanced by increasing the molecular weight of the polyolefin resin.

In view of such prior art as mentioned above, a polyolefin resin composition which has particularly excellent heat resistance in addition to excellent mechanical properties, permeability, dimensional stability and shutdown properties and is suitable particularly for a microporous membrane has been desired in the market.

Citation List

Patent Literature

Patent literature 1: Japanese Patent Laid-Open Publication No. 126352/1992
Patent literature 2: Japanese Patent Laid-Open Publication No. 234578/1993
Patent literature 3: Japanese Patent Laid-Open Publication No. 196870/2004
Patent literature 4: Japanese Patent Laid-Open Publication No. 161899/2004
Patent literature 5: Japanese Patent Laid-Open Publication No. 60084/1995

SUMMARY OF INVENTION

Technical Problem

It is an object of the present invention to provide a polyolefin resin composition which is excellent in mechanical properties and dimensional stability and is particularly excellent in heat resistance, a film which is excellent in mechanical properties, dimensional stability and heat resistance because it is obtained from the polyolefin resin composition and which is particularly excellent in meltdown properties, a microporous membrane which is excellent in permeability and shutdown properties in addition to the above properties, and uses thereof.

Solution to Problem

As a result of earnest studies in view of the above object, the present inventors have found that a polyolefin resin composition (C) comprising a specific amount of ultrahigh-molecular weight polyethylene (A) having a specific intrinsic viscosity and a specific amount of a polymer (B) containing a repeating unit derived from 4-methyl-1-pentene (said polymer being sometimes referred to as "polymethylpentene" hereinafter) is excellent in mechanical properties, dimensional stability and heat resistance and is particularly excellent in heat resistance among them and that a film and a microporous membrane obtained from the polyolefin resin composition are excellent in mechanical properties, permeability, dimensional stability and heat resistance and are particularly excellent in shutdown properties and meltdown properties. Thus, the present invention has been accomplished.

That is to say, the polyolefin resin composition (C) comprises (i) 85 to 50% by mass of ultrahigh-molecular weight polyethylene (A) having an intrinsic viscosity [η], as measured in decalin at 135° C. in accordance with ASTM D4020, of 3.5 to 35 dl/g and (ii) 15 to 50% by mass of a polymer (B) (polymethylpentene) containing a repeating unit derived from 4-methyl-1-pentene, in 100% by mass of the polyolefin resin composition (C).

It is preferable that the amount of the ultrahigh-molecular weight polyethylene (A) is in the range of 79 to 50% by mass and the amount of the polymer (B) containing a repeating unit derived from 4-methyl-1-pentene is in the range of 21 to 50% by mass, each amount being based on 100% by mass of the polyolefin resin composition (C).

The polyolefin resin composition (C) is preferably a composition for a microporous membrane, particularly for a battery separator.

The composition for a microporous membrane of the present invention comprises the above-mentioned polyolefin resin composition (C) and a plasticizer.

The film, the microporous membrane and the battery separator of the present invention are each obtained from the above-mentioned polyolefin resin composition (C).

The process for producing a microporous membrane of the present invention comprises extruding the polyolefin composition for a microporous membrane from a die, cooling the extrudate to form a sheet, stretching the sheet and then extracting the plasticizer to remove it. The sheet is preferably in the form of a gel.

Advantageous Effects of Invention

The polyolefin film obtained from the polyolefin resin composition of the present invention is excellent in mechanical properties, dimensional stability and heat resistance and is particularly excellent in meltdown properties. The microporous membrane obtained from the polyolefin resin composition of the present invention is excellent in permeability and shutdown properties in addition to the above properties, and therefore, it can be favorably used as, for example, a battery separator of a lithium ion battery comprising a polyolefin microporous membrane. On that account, the industrial value of the polyolefin resin composition of the present invention is extremely high.

BRIEF DESCRIPTION OF DRAWINGS

FIG. 1 is a 1000-magnification TEM image of a film (Example 2) made of the polyolefin resin composition of the present invention. In this figure, a black circle represents a phase of ultrahigh-molecular weight polyethylene, and a void square represents a phase of polymethylpentene.

FIG. 2 is a view showing a portion of a continuous phase of ultrahigh-molecular weight polyethylene in the TEM image of FIG. 1, said portion being indicated by oblique lines.

FIG. 3 is a graph in which the 50 μm penetration temperature in TMA is plotted against the amount of polymethylpentene contained in a film made of a polyolefin resin composition using the examples and the comparative examples.

DESCRIPTION OF EMBODIMENTS

The polyolefin resin composition (C) of the present invention is described in detail hereinafter.

The polyolefin resin composition (C) of the present invention comprises specific ultrahigh-molecular weight polyethylene (A) and a polymer (B) containing a repeating unit derived from 4-methyl-1-pentene, in specific proportions.

Ultrahigh-Molecular Weight Polyethylene (A)

The ultrahigh-molecular weight polyethylene (A) contained as a main component in the polyolefin resin composition (C) of the present invention is a homopolymer of ethylene or a copolymer of ethylene and an α-olefin such as propylene, 1-butene, 1-pentene, 1-hexene, 1-octene, 1-decene, 1-dodecene, 4-methyl-1-pentene or 3-methyl-1-pentene, each of said homopolymer and copolymer having a specific intrinsic viscosity [η].

Of such polymers, a homopolymer of ethylene or a copolymer of ethylene and the above α-olefin, which contains ethylene as a main component and has an ethylene content of not less than 50% by mass, preferably 70 to 100% by mass, more preferably 90 to 100% by mass, is preferable because a microporous membrane having excellent permeability and shutdown properties is obtained.

The lower limit of the intrinsic viscosity [η] of the ultrahigh-molecular weight polyethylene (A) in the present invention, as measured in decalin at 135° C. in accordance with ASTM D4020, is 3.5 dl/g, preferably 4.0 dl/g, more preferably 5.0 dl/g, still more preferably 8.0 dl/g, particularly preferably 10.0 dl/g. The upper limit of the intrinsic viscosity [η] thereof is 35 dl/g, preferably 30 dl/g, more preferably 26 dl/g, still more preferably 23 dl/g, particularly preferably 20 dl/g. If the intrinsic viscosity [η] is less than 3.5 dl/g, strength of a film and a microporous membrane made of the resulting polyolefin resin (C) is lowered. If the intrinsic viscosity [η] is more than 35 dl/g, it becomes difficult to produce a film and a microporous membrane containing the ultrahigh-molecular weight polyethylene.

Accordingly, when the intrinsic viscosity [η] of the ultrahigh-molecular weight polyethylene (A) is in the above range, mechanical properties and dimensional stability inherent in the ultrahigh-molecular weight polyethylene can be more effectively imparted to the polyolefin resin composition (C).

In the present invention, the ultrahigh-molecular weight polyethylene (A) can be obtained by a hitherto publicly known process. For example, it can be prepared by polymerizing an ethylene monomer in plural stages in the presence of a catalyst with changing the intrinsic viscosity, as described in International Publication No. 03/022920 Pamphlet.

Polymer Containing Repeating Unit Derived From 4-methyl-1-pentene: polymethylpentene (B)

The polymer containing a repeating unit derived from 4-methyl-1-pentene, which is contained as a component in the polyolefin resin composition (C) of the present invention, that is, polymethylpentene (B) is a homopolymer of 4-methyl-1-pentene or a copolymer of 4-methyl-1-petene and an α-olefin of 2 to 20 carbon atoms other than 4-methyl-1-petene.

The above copolymer is a copolymer of 4-methyl-1-pentene and an α-olefin of 2 to 20 carbon atoms other than 4-methyl-1-petene, preferably an α-olefin of 5 to 20 carbon atoms. Examples of the α-olefins of 2 to 20 carbon atoms include ethylene, propylene, 1-butene, 1-hexene, 1-heptene, 1-octene, 1-decene, 1-dodecene, 1-tetradecene, 1-hexadecene, 1-heptadecene, 1-octadecene and 1-eicosene. These α-olefins can be used singly or in combination of two or more kinds. Of these, 1-decene, 1-dodecene, 1-tetradecene, 1-hexadecene, 1-heptadecene or 1-octadecene is preferable, and because of good rigidity and elastic modulus, 1-decene, 1-dodecene or 1-tetradecene is more preferable. It is preferable that the repeating units derived from 4-methyl-1-petnene are usually contained in an amount of not less than 80% by mass, preferably 90 to 99% by mass, more preferably 95 to 99% by mass. When the amount of the repeating units is in the above range, toughness of a film in the film stretching is excellent.

MFR of the polymethylpentene (B), as measured at a temperature of 260° C. under a load of 5.0 kg in accordance with ASTM D1238, is in the range of 0.1 to 220 g/10 min, preferably 0.1 to 20 g/10 min, more preferably 0.1 to 10 g/10 min. When MFR of the polymethylpentene (B) is in the above range, moldability into a film is excellent.

In the present invention, the polymethylpentene (B) can be prepared by the use of a known catalyst, such as a Ziegler-Natta catalyst or a metallocene catalyst. For example, the polymethylpentene (B) can be obtained by polymerizing 4-methyl-1-pentene and ethylene or the above α-olefin in the presence of a catalyst, as described in Japanese Patent Laid-Open Publication No. 105022/2003.

Polyolefin Resin Composition (C)

The polyolefin resin composition (C) of the present invention comprises, in 100% by mass of the polyolefin resin composition (C), more than 40% by mass but not more than 85% by mass of the ultrahigh-molecular weight polyethylene (A) and not less than 15% by mass but less than 60% by mass of the polymethylpentene (B), preferably 85 to 50% by mass of the ultrahigh-molecular weight polyethylene (A) and 15 to 50% by mass of the polymethylpentene (B), more preferably 79 to 50% by mass of the ultrahigh-molecular weight polyethylene (A) and 21 to 50% by mass of the polymethylpentene (B), still more preferably 75 to 50% by mass of the ultrahigh-molecular weight polyethylene (A) and 25 to 50% by mass of the polymethylpentene (B), most preferably 70 to 50% by mass of the ultrahigh-molecular weight polyethylene (A) and 30 to 50% by mass of the polymethylpentene (B). When the amounts of the ultrahigh-molecular weight polyethylene (A) and the polymethylpentene (B) are in the above ranges, a film excellent in mechanical properties, dimensional stability and heat resistance and particularly excellent in meltdown properties and a microporous membrane excellent in permeability and shutdown properties in addition to the above properties can be obtained.

As described later, even if the polymethylpentene (B) is added in an amount of not less than 60% by mass in 100% by mass of the polyolefin resin composition (C), there is a tendency for the heat resistance (50 μm penetration temperature) not to greatly increase. In this case, the content of the ultrahigh-molecular weight polyethylene is decreased, and hence, mechanical properties tend to be lowered.

Moreover, it has been clarified by the present invention that a film obtained from the polyolefin resin composition (C) containing the ultrahigh-molecular weight polyethylene (A) and the polymethylpentene (B) in the above amounts exhibits an excellent effect hitherto unknown with regard to the heat resistance.

The polyolefin resin composition (C) of the present invention may further contain additives that are added to usual polyolefin, e.g., publicly known various stabilizers, such as heat stabilizer, weathering stabilizer, rust preventive, copper inhibitor and antistatic agent, flame retardant, crosslinking agent, crosslinking assistant, antistatic agent, slip agent, anti-blocking agent, anti-fogging agent, lubricant, dye, pigment, filler, mineral oil-based softener, petroleum resin and wax, within limits not detrimental to the object of the present invention. These additives can be used singly or in combination of two or more kinds.

In the present invention, polyolefin-based resins other than the ultrahigh-molecular weight polyethylene (A) and the polymethylpentene (B) for use in the present invention may be further contained within limits not detrimental to the object of the present invention. Although such polyolefin-based resins are not specifically restricted, examples thereof include high-density polyethylene, medium-density polyethylene, low-density polyethylene and a polypropylene-based polymer.

The polyolefin resin composition (C) can be obtained by blending the ultrahigh-molecular weight polyethylene (A) and the polymethylpentene (B) in the above amounts, if necessary adding additives and the aforesaid polyolefin-based resin in amounts not detrimental to the object of the present invention, then mixing them by a mixer such as Banbury mixer or Henschel mixer, melt kneading the mixture by a single screw extruder, a twin-screw extruder, a kneader or the like and granulating or pulverizing the kneadate. The melting temperature in the melt kneading is usually in the range of 160 to 300° C., preferably 180 to 280° C.

The polyolefin resin composition (C) of the present invention is useful as a raw material of a film, a microporous membrane or a battery separator, and is particularly useful for a battery separator of a lithium secondary battery, a nickel-hydrogen battery, a nickel-cadmium battery, a polymer battery or the like.

Film Made of Polyolefin Resin Composition (C)

The film made of the polyolefin resin composition (C) (also referred to as a "polyolefin film") of the present invention can be produced by subjecting the polyolefin resin composition (C) to film production by a publicly known method, such as press molding, extrusion method, inflation method or calendering.

It has been clarified for the first time by the present invention that the film made of the polyolefin resin composition (C) of the present invention exhibits excellent heat resistance such that the measurement results of 50 μm penetration temperatures of the film in the penetration method using TMA under the conditions of a test load of 50 g and a heating rate of 5.0° C./min in accordance with JIS K7196 are greatly different from usual results of the measurement on a mixed composition of different resins.

That is to say, the measurement results of the penetration temperatures of a film made of a mixed composition of different resins are usually expected to be temperatures below the line of additivity shown in FIG. 3 according to the Fox equation. Details of the Fox equation are described in Bulletin of the American Physical Society, Series 2, Vol. 1, No. 3, p. 123 (1956). In the case of the film made of the polyolefin resin composition (C), which is obtained by the present invention, however, a convex line can be drawn above the expected line of additivity, as shown in the plot of FIG. 3, and therefore, by mixing the polymethylpentene (B), the heat resistance is increased by 10° C. or more and is increased by 20° C. or more depending upon the mixing ratio of the polymethylpentene (B), as compared with the temperature given when the ultrahigh-molecular weight polyethylene (A) is used alone. Thus, it can be mentioned as a characteristic of the film obtained by the present invention that the film exhibits excellent heat resistance.

It has been found from the results shown in FIG. 3 that if the mass ratio of the polymethylpentene (B) is not less than 15% by mass, preferably not less than 21% by mass, in 100% by mass of the polyolefin resin composition (C), the film made of the polyolefin resin composition (C), which is obtained by the present invention, exhibits specifically excellent heat resistance. Although the reason is not clear, the following can be presumed. That is to say, it is considered that for the retention of a shape of a film at a high temperature (retention of heat resistance), it is necessary that the polymethylpentene (B) should form a continuous phase. It is also considered that in order that the polymethylpentene (B) may forma structure of a continuous phase by mixing the two polymers of the ultrahigh-molecular weight polyethylene (A) and the polymethylpentene (B), not less than a certain amount of the polymethylpentene (B) is necessary, and it is assumed that its mass ratio corresponds to the above-mentioned amount.

In order to verify the above assumption, a film made of the polyolefin resin composition, which is obtained by the present invention, is observed by a transmission electron microscope (TEM), and as a result, it has become clear that if the amount of the polymethylpentene (B) is less than 15% by mass in 100% by mass of the polyolefin resin composition (C), the phase of the polymethylpentene (B) becomes discontinuous (disperse phase). It has been also found that if the amount of the ultrahigh-molecular weight polyethylene (A) is less than 50% by mass, the phase of the ultrahigh-molecular weight polyethylene (A) becomes discontinuous (disperse phase), similarly to the above. As described above, it can be seen from the measurement results by TEM that in the film made of the polyolefin resin composition (C) of the present invention, the phase of the ultrahigh-molecular weight polyethylene (A) and the phase of the polymethylpentene (B) are both continuous phases, and it is thought that the assumed cause of appearance of the aforesaid specific heat resistance has been proved positively.

When the amounts of the ultrahigh-molecular weight polyethylene (A) and the polymethylpentene (B) in the polyolefin resin composition (C) of the present invention are in the above ranges, the phase of the polyethylene (A) and the phase of the polymethylpentene (B) both become continuous phases, so that an excellent film having both of mechanical strength and dimensional stability of the ultrahigh-molecular weight polyethylene (A) and heat resistance of the polymethylpentene (B) is obtained from the polyolefin resin composition (C). If any one of the phases of the ultrahigh-molecular weight polyethylene (A) and the polymethylpentene (B) is discontinuous, such properties as above cannot be obtained.

The film made of the polyolefin resin composition (C) of the present invention may be used in the form of a multi-layer film of the polyolefin resin composition (C) and another resin. The multi-layer film can be produced by dry lamination method, co-extrusion method, extrusion lamination method, heat lamination method or the like.

Microporous Membrane Made of Polyolefin Resin Composition (C)

The microporous membrane made of the polyolefin resin composition (C) of the present invention is preferably constituted of the specific amounts of the ultrahigh-molecular weight polyethylene (A) and the polymethylpentene (B), similarly to the above-mentioned film. By virtue of this, an excellent microporous membrane having both of mechanical strength, dimensional stability, permeability and shutdown properties of the ultrahigh-molecular weight polyethylene (A) and heat resistance, permeability and meltdown properties of the polymethylpentene (B) is obtained. If any one of the phases of the ultrahigh-molecular weight polyethylene (A) and the polymethylpentene (B) is discontinuous, such properties as above cannot be obtained.

As described with regard to the film, it has been also found that if the amount of the ultrahigh-molecular weight polyethylene (A) is less than 50% by mass in 100% by mass of the polyolefin resin composition (C), the phase of the ultrahigh-molecular weight polyethylene (A) becomes discontinuous (disperse phase). A microporous membrane made of a polyolefin resin composition obtained in such a ratio has insufficient permeability and does not exhibit shutdown properties. The mechanical strength and the dimensional stability are not sufficient either. Therefore, the amount of the ultrahigh-molecular weight polyethylene (A) needs to be not less than 50% by mass.

The polyolefin microporous membrane in a preferred embodiment of the present invention has the following properties.

(1) The film thickness variation ratio of a film thickness given after the film is compressed by a press at 90° C. for 5 minutes under a pressure of 2.2 MPa to a film thickness prior to the compression is not more than 15%. If the film thickness variation ratio exceeds 15%, short circuit is liable to occur when the microporous membrane is used as a battery separator, or battery productivity is liable to be lowered because of lowering of yield.

(2) The porosity is in the range of 25 to 89%. If the porosity is less than 25%, good gas permeability is not obtained. On the other hand, if the porosity exceeds 80%, battery safety and impedance are not balanced with each other. The porosity is measured by a weighing method.

(3) The gas permeability obtained by conversion from a Gurley value in accordance with JIS P8117 is in the range of 20 to 550 sec/100 cc with the proviso that the film thickness is 16 μm. By virtue of a gas permeability of 20 to 550 sec/100 cc, battery volume is increased, and battery cycle properties become good. If the gas permeability exceeds 550 sec/100 cc, battery volume is decreased when the polyolefin microporous membrane is used as a battery separator. On the other hand, if the gas permeability is less than 20 sec/100 cc, shutdown is not sufficiently carried out in the temperature rise inside the battery.

(4) The piercing strength is not less than 2450 mN/16 μm. If the piercing strength is less than 2450 mN/16 μm, short circuit is liable to occur when the polyolefin microporous membrane is incorporated in a battery as a battery separator. The piercing strength is determined as a maximum load value given when the microporous membrane is pierced with a needle having a diameter of 1 mm (0.5 mmR) at a rate of 2 mm/sec.

(5) The heat shrinkage ratio after exposure at 105° C. for 8 hours is not more than 5% in each of the machine direction (MD) and the transverse direction (TD). If the heat shrinkage ratio exceeds 5%, a separator edge shrinks and there is a high possibility of occurrence of short circuit in the case where the polyolefin microporous membrane is used as a lithium battery separator and heat is generated.

(6) The shutdown temperature is in the range of 120 to 140° C. The shutdown temperature is a temperature at which the gas permeability becomes not less than 100,000 sec/100 cc when the microporous membrane is heated to a given temperature.

(7) The meltdown temperature is not lower than 165° C., preferably 165 to 190° C. The meltdown temperature is a temperature at which the microporous membrane is broken when it is heated to a given temperature.

Process for Producing Microporous Membrane Made of Polyolefin Resin Composition (C)

The process for producing a microporous membrane made of the polyolefin resin composition of the present invention comprises:

(a) a step of melt kneading the ultrahigh-molecular weight polyethylene (A), the polymethylpentene (B) and a plasticizer to prepare a polyolefin composition, (b) a step of extruding the polyolefin composition from a die and cooling the extrudate to form a gel sheet, (c) a step of stretching the sheet and removing the plasticizer, and (d) a step of drying the resulting membrane.

(a) Polyolefin Composition Preparation Step

First, the polyolefin resin composition (C) and a plasticizer are melt kneaded to prepare a polyolefin composition favorable for a microporous membrane, particularly for a battery separator.

As the plasticizer, a publicly known plasticizer can be used provided that it is liquid, or solid but becomes liquid at a high temperature and it can be extracted with a wash solvent described later. When a plasticizer which is liquid at room temperature is used as the plasticizer, stretching in a relatively high stretch ratio tends to become possible. Such a liquid plasticizer is not specifically restricted, but aliphatic or cyclic hydrocarbons, such as nonane, decane, decalin, paraxylene, undecane, dodecane and liquid paraffin, mineral oil fractions having boiling points corresponding to those of the above hydrocarbons, and phthalic acid esters which are liquid at room temperature, such as dibutyl phthalate and dioctyl phthalate, can be used. In order to obtain a gel sheet having a stable content of a liquid plasticizer, it is preferable to use a non-volatile liquid plasticizer such as liquid paraffin. In the present invention, it is also preferable to use a plasticizer which is solid but becomes liquid at a high temperature. A plasticizer which becomes miscible with the polyolefin resin composition when they are melt kneaded by heating but which is solid at room temperature may be mixed with the liquid plasticizer. Examples of such plasticizers include paraffin wax which is solid at ordinary temperature, and higher aliphatic alcohols, such as stearyl alcohol and ceryl alcohol.

The method for melt kneading is not specifically restricted, but in usual, the components are homogeneously kneaded in a twin-screw extruder. This method is suitable for preparing a high-concentration solution of polyolefin. The melting temperature is in the range of 160 to 300° C., preferably 180 to 280° C.

In the polyolefin composition, the blending ratio between the polyolefin resin composition (C) and the plasticizer is as follows. The amount of the polyolefin resin composition (C) is in the range of 1 to 50 parts by mass, preferably 20 to 40 parts by mass, with the proviso that the total amount of the polyolefin resin composition (C) and the plasticizer is 100 parts by mass.

(b) Sheet Formation Step

The polyolefin composition obtained by melt kneading is extruded from a die directly or through another extruder, or the thus extruded polyolefin composition is cooled once, then pelletized and thereafter extruded again from a die through an extruder. As the die, a sheet die is usually used, but a double cylindrical hollow die, an inflation die or the like can be also used. The melting temperature in the extruding is usually in the range of 140 to 280° C.

The solution extruded from the die as above is cooled to produce a molded product. Thus, a phase separation structure in which the polyolefin phase has been micro-phase separated by the plasticizer can be fixed. The molded product is preferably in the form of a gel.

(c) Stretching/Plasticizer-Removal Step

Subsequently, the resulting sheet is stretched, and then the liquid solvent is extracted and removed; or the liquid solvent is extracted and removed from the sheet, and then the sheet is stretched; or the sheet is stretched, then the liquid solvent is extracted and removed, and the sheet is further stretched. The sheet is preferably in the form of a gel.

Stretching of the sheet is carried out in a given stretch ratio by usual tenter method, roll method, inflation method, calendering method or a combination thereof, after the sheet is heated. The stretching may be either monoaxial stretching or biaxial orientation, but biaxial orientation is preferable. The biaxial orientation may be any of simultaneous biaxial orientation, successive stretching and multi-stage stretching (e.g., combination of simultaneous biaxial orientation and successive stretching), but simultaneous biaxial orientation is preferable. By carrying out stretching, mechanical strength is enhanced.

The stretch ratio varies depending upon the thickness of the sheet, but in the case of monoaxial stretching, the stretch ratio is preferably two times or more, more preferably 3 to 30 times. In the case of biaxial orientation, the stretch ratio is at least 3 times in either direction, and the stretch ratio in terms of areal stretch ratio is preferably 9 times or more, more preferably 25 times or more. By setting the areal stretch ratio to 9 times or more, piercing strength is enhanced. The stretching is carried out at a stretching temperature of 100 to 140° C., preferably 110 to 120° C.

For the removal (washing) of the plasticizer, a wash solvent is used. Since the polyolefin is phase-separated from the plasticizer, the plasticizer is extracted and removed, whereby a porous membrane is obtained. The removal (washing) of the plasticizer can be carried out by the use of a publicly known wash solvent. Examples of the publicly known wash solvents include chlorinated hydrocarbons, such as methylene chloride and carbon tetrachloride, hydrocarbons, such as pentane, hexane and heptane, fluorinated hydrocarbons, such as trifluoroethane, ethers, such as diethyl ether and dioxane, and easy-volatile solvents, such as methyl ethyl ketone.

The washing can be carried out by a method of immersing the stretched membrane or sheet in a wash solvent, a method of showering the stretched membrane or sheet with a wash solvent, or a combined method thereof. The washing with a wash solvent is preferably carried out until the residue of the plasticizer becomes less than 1 part by mass based on the amount of the plasticizer added.

(d) Membrane Drying Step

The membrane obtained by the above stretching and removal of plasticizer can be dried by heating or air drying. The drying temperature is preferably a temperature lower than the crystal dispersing temperature of the polyethylene, particularly preferably a temperature lower than the crystal dispersing temperature by 5° C. or more.

If the membrane is dried by the above drying within limits not detrimental to the object of the present invention, no particular problems occur. However, it is preferable to reduce the content of the wash solvent remaining in the polyolefin microporous membrane to not more than 5 parts by mass, and it is more preferable to reduce it to not more than 3 parts by mass. If the wash solvent remains in a large amount in the membrane because of insufficient drying, the porosity is lowered in the subsequent heat treatment and the permeability is deteriorated, so that such a case is undesirable.

Battery Separator

The battery separator constituted of the microporous membrane made of the polyolefin resin composition (C) of the present invention has a micropore-closure temperature (shutdown temperature) of not higher than 140° C. and a membrane-break occurring temperature (meltdown temperature) of not lower than 165° C., has a difference between the meltdown temperature and the shutdown temperature of 25° C. or more, and has extremely high safety as compared with conventional battery separators.

The microporous membrane of the present invention has excellent properties as previously described.

On that account, the battery separator of the present invention is extremely useful from the viewpoint of safety, and hence, the separator is particularly preferable as a lithium battery separator. Since the separator of the present invention has a three-dimensional homogeneous porous structure constituted of micropores, it is excellent not only in safety (heat resistance, shutdown properties and meltdown properties) but also in mechanical properties, porosity and permeability, and it is widely useful as a separator for primary batteries and secondary batteries, such as lithium secondary battery, nickel-hydrogen battery, nickel-cadmium battery and polymer battery.

Examples

The present invention is further described with reference to the following examples, but it should be construed that the present invention is in no way limited to those examples. Sample preparation processes and property measuring methods used in the examples and the comparative examples are given below.

Intrinsic Viscosity [η]

Intrinsic viscosity [η] was measured in decalin at 135° C. in accordance with ASTM D4020.

MFR

MFR was measured at a temperature of 260° C. under a load of 5.0 kg in accordance with ASTM D1238.

Density

Density was measured by a density gradient tube method in accordance with ASTM D1505.

TMA

A temperature at which a probe penetrated by 50 μm was measured by a penetration method under the conditions of a test load of 50 g and a heating rate of 5.0° C./min in accordance with JIS K7196.

Dispersibility

The phase of ultrahigh-molecular weight polyethylene (A) and the phase of polymethylpentene (B) were observed by a transmission electron microscope (TEM) of 1000 magnifications to judge whether each phase was continuous or discontinuous. As an example, a portion wherein the phase of ultrahigh-molecular weight polyethylene (A) is continuous (portion indicated by oblique lines) is shown in FIG. 2.

Ultrahigh-Molecular Weight Polyethylene (A)

Ultrahigh-molecular weight polyethylene (A) was obtained by the following process.

Preparation of Solid Catalyst Component 47.6 g (0.5 mol) of anhydrous magnesium chloride, 0.25 liter of decane and 0.23 liter (1.5 mol) of 2-ethylhexyl alcohol were subjected to thermal reaction at 130° C. for 2 hours to give a homogeneous solution, and then to the solution was added 7.4 ml (50 mmol) of ethyl benzoate. The resulting homogeneous solution was cooled down to room temperature, and then to 1.5 liters of titanium tetrachloride maintained at −5° C., the resulting solution was dropwise added in the whole amount over a period of 1 hour with stirring. The reactor used was a 3-liter glass separable flask, and the stirring rate was 950 rpm. After the dropwise addition was completed, the temperature of the mixed solution was raised to 90° C., and reaction was carried out at 90° C. for 2 hours. After the reaction was completed, the solid portion was collected by filtration and sufficiently washed with hexane to obtain a high-activity titanium catalyst component in the form of a fine powder. The content of titanium in the catalyst component thus obtained was 3.9% by mass.

Preparation of Ultrahigh-Molecular Weight Polyethylene (A)

In a SUS polymerizer having an internal volume of 35 liters and equipped with a stirrer, 10 liters of n-hexane, 10 mmol of triethylaluminum and 0.2 mmol (in terms of Ti atom) of the solid titanium catalyst component obtained above were placed in a nitrogen atmosphere, and the temperature in the polymerizer was raised to 70° C., followed by maintaining the same temperature. Thereafter, ethylene gas was fed to the polymerizer at a rate of 1 Nm$^3$/hr. The polymerization temperature was maintained at 70° C. by jacket cooling, and the polymerization pressure was in the range of 1 to 8 kg/cm$^2$-G. When the integration quantity of ethylene fed became 18 Nm$^3$/hr, feed of ethylene was terminated, and stirring was continued for 10 minutes. Thereafter, cooling and release of pressure were carried out. The resulting resin composition was separated from the solvent by a centrifugal separator, washed with acetone twice and then vacuum dried in a stream of nitrogen at 70° C. to obtain ultrahigh-molecular weight polyethylene (A).

The yield of the resulting ultrahigh-molecular weight polyethylene (A) was 22.2 kg, and the ultrahigh-molecular weight polyethylene had an intrinsic viscosity [η] of 17 dl/g and a density of 940 kg/m$^3$.

Polymethylpentene (B)

A polymer (polymethylpentene (B)) containing a repeating unit derived from 4-methyl-1-pentene was obtained by the following process.

Preparation of Solid Catalyst Component 750 g of anhydrous magnesium chloride, 2800 g of decane and 3080 g of 2-ethylhexyl alcohol were subjected to thermal reaction at 130° C. for 3 hours to give a homogeneous solution, then to the solution was added 220 ml of 2-isobutyl-2-isopropyl-1,3-dimethoxypropane, and they were stirred and mixed at 100° C. for 1 hour. The homogeneous solution thus obtained was cooled down to room temperature, and then to 800 ml of titanium tetrachloride maintained at −20° C. was dropwise added the whole amount of 3000 ml of the homogeneous solution over a period of 45 minutes with stirring. After the dropwise addition was completed, the temperature of the mixed solution was raised to 110° C. over a period of 4.5 hours. When a temperature of 110° C. was reached, 5.2 ml of 2-isobutyl-2-isopropyl-1,3-dimethoxypropane was added, and the mixture was maintained at the same temperature for 2 hours with stirring. After the reaction of 2 hours was completed, the solid portion was collected by hot filtration. This solid portion was resuspended in 1000 ml of titanium tetrachloride, and then the suspension was subjected to thermal reaction at 110° C. for 2 hours again. After the reaction was completed, the solid portion was collected by hot filtration again and sufficiently washed with decane at 90° C. and hexane until a titanium compound liberated in the wash liquid was not detected. Although the solid titanium catalyst component prepared through the above operations was stored as a decane slurry, a part of it was dried for the purpose of examining composition of the catalyst. The composition of the catalyst component thus obtained was as follows: titanium: 3.0% by mass, magnesium: 17.0% by mass, chlorine: 57% by mass, 2-isobutyl-2-isopropyl-1,3-dimethoxypropane: 18.8% by mass, and 2-ethylhexyl alcohol: 1.3% by mass.

Preparation of Polymethylpentene (B)

In a SUS polymerizer having an internal volume of 150 liters and equipped with a stirrer, 100 liters of decane, 27 kg of 4-methyl-1-pentene, 570 g of decene-1, 6.75 liters of hydrogen, 67.5 mmol of triethylaluminum and 0.27 mol (in terms of Ti atom) of the solid titanium catalyst component were placed in a nitrogen atmosphere, and the temperature in the polymerizer was raised to 60° C., followed by maintaining the same temperature. After polymerization time of 6 hours passed, the resulting powder was taken out of the polymerizer, filtered, washed and then dried to obtain a polymer (polymethylpentene (B)) containing a repeating unit derived from 4-methyl-1-pentene. The yield of the resulting polymer (polymethylpentene (B)) was 26 kg, and the polymer had MFR (load of 5.0 kg, temperature of 260° C.) of 7 g/10 min, and a decene-1 content of 2.4% by mass.

Example 1

The ultrahigh-molecular weight polyethylene (A) and the polymethylpentene (B) obtained above were blended in a mass ratio of 70/30 (ultrahigh-molecular weight polyethylene/polymethylpentene (B)) and mixed by a Henschel mixer. Thereafter, the mixture was melt kneaded by a twin-screw extruder of 45 mm diameter at preset temperatures of C1/C2/C3/D1=270/270/270/270° C. and a screw rotational speed of 150 rpm to obtain pellets. The preset temperatures C1, C2 and C3 are cylinder temperatures in the direction of a nozzle tip from the lower part of the hopper, and the preset temperature D1 is a die temperature.

The resulting pellets were introduced into a mold having a thickness of 500 μm, and by the use of a press molding machine, a pressure of 10 MPa was applied at a press temperature of 270° C. After thermal inertia for 5 minutes, steps of release of pressure and application of pressure (10 MPa) were repeated 10 times. Subsequently, a pressure of 10 MPa was applied again, and the pressure was kept for 5 minutes. After release of pressure, a pressure of 10 MPa was applied by a press molding machine at 50° C., followed by cooling. Thus, a film having a thickness of 500 μm was obtained.

A 50 μm penetration temperature of the resulting film was measured by TMA. The result is set forth in Table 1.

Example 2

A film was obtained in the same manner as in Example 1, except that the mass ratio of the ultrahigh-molecular weight polyethylene (A) to the polymethylpentene (B) was changed to 75/25 (ultrahigh-molecular weight polyethylene (A)/polymethylpentene (B)). The result is set forth in Table 1.

Example 3

A film was obtained in the same manner as in Example 1, except that the mass ratio of the ultrahigh-molecular weight polyethylene (A) to the polymethylpentene (B) was changed to 85/15 (ultrahigh-molecular weight polyethylene (A)/polymethylpentene (B)). The result is set forth in Table 1.

Example 4

A film was obtained in the same manner as in Example 1, except that the mass ratio of the ultrahigh-molecular weight polyethylene (A) to the polymethylpentene (B) was changed to 55/45 (ultrahigh-molecular weight polyethylene (A)/polymethylpentene (B)). The result is set forth in Table 1.

Example 5

A film was obtained in the same manner as in Example 1, except that after the ultrahigh-molecular weight polyethylene (A) and the polymethylpentene (B) were blended in a mass ratio of 70/30 (ultrahigh-molecular weight polyethylene/polymethylpentene (B)), pentaerythritol tetrakis[3-(3,4-di-tert-butyl-4-hydroxyphenyl)propionate] was further added as an antioxidant in an amount of 0.06 part by mass based on 100 parts by mass of the polyolefin resin composition (C). The result is set forth in Table 1.

Example 6

A film was obtained in the same manner as in Example 1, except that ultrahigh-molecular weight polyethylene having an intrinsic viscosity [η] of 8.0 dl/g was used as the ultrahigh-molecular weight polyethylene (A). The result is set forth in Table 2.

Example 7

A film was obtained in the same manner as in Example 1, except that ultrahigh-molecular weight polyethylene having an intrinsic viscosity [η] of 20.0 dl/g was used as the ultrahigh-molecular weight polyethylene (A). The result is set forth in Table 2.

Example 8

A film was obtained in the same manner as in Example 1, except that ultrahigh-molecular weight polyethylene having an intrinsic viscosity [η] of 26.0 dl/g was used as the ultrahigh-molecular weight polyethylene (A). The result is set forth in Table 2.

Comparative Example 1

A film was obtained in the same manner as in Example 1, except that 100 parts by mass of the ultrahigh-molecular weight polyethylene (A) were only used. The result is set forth in Table 3.

Comparative Example 2

A film was obtained in the same manner as in Example 1, except that the mass ratio of the ultrahigh-molecular weight polyethylene (A) to the polymethylpentene (B) was changed to 90/10 (ultrahigh-molecular weight polyethylene (A)/polymethylpentene (B)). The result is set forth in Table 3.

Comparative Example 3

A film was obtained in the same manner as in Example 1, except that the mass ratio of the ultrahigh-molecular weight polyethylene (A) to the polymethylpentene (B) was changed to 40/60 (ultrahigh-molecular weight polyethylene (A)/polymethylpentene (B)). The result is set forth in Table 3.

Comparative Example 4

A film was obtained in the same manner as in Example 1, except that 20 parts by mass of the ultrahigh-molecular weight polyethylene (A), 10 parts by mass of the polymethylpentene (B) and 70 parts by mass of high-density polyethylene (HDPE) having Mw of $3.5 \times 10^5$ and a melting point of 135° C. were used. The result is set forth in Table 3.

Comparative Example 5

A film was obtained in the same manner as in Example 1, except that 100 parts by mass of the polymethylpentene (B) were only used. The result is set forth in Table 3.

TABLE 1

|  |  | Ex. 1 | Ex. 2 | Ex. 3 | Ex. 4 | Ex. 5 |
|---|---|---|---|---|---|---|
| Ultrahigh-molecular weight polyethylene (A) | part(s) by mass | 70 | 75 | 85 | 55 | 70 |
| Polymethylpentene (B) | part(s) by mass | 30 | 25 | 15 | 45 | 30 |
| Antioxidant | part(s) by mass | — | — | — | — | 0.06 |
| HDPE | part(s) by mass | — | — | — | — | — |
| 50 μm Penetration temperature by TMA | ° C. | 187 | 165 | 154 | 207 | 187 |
| Dispersed state  PE phase | — | continuous | continuous | continuous | continuous | continuous |
| PMP phase | — | continuous | continuous | continuous | continuous | continuous |

PE phase: phase derived from ultrahigh-molecular weight polyethylene (A)
PMP phase: phase derived from polymethylpentene (B)

TABLE 2

|  |  | Ex. 6 | Ex. 7 | Ex. 8 |
|---|---|---|---|---|
| Ultrahigh-molecular weight polyethylene (A) | part(s) by mass | 70 | 70 | 70 |
| Intrinsic viscosity of (A) | dl/g | 8.0 | 20.0 | 26.0 |
| Polymethylpentene (B) | part(s) by mass | 30 | 30 | 30 |
| Antioxidant | part(s) by mass | — | — | — |
| HDPE | part(s) by mass | — | — | — |
| 50 μm Penetration temperature by TMA | ° C. | 186 | 187 | 188 |
| Dispersed state  PE phase | — | continuous | continuous | continuous |
| PMP phase | — | continuous | continuous | continuous |

PE phase: phase derived from ultrahigh-molecular weight polyethylene (A)
PMP phase: phase derived from polymethylpentene (B)

TABLE 3

|  |  | Comp. Ex. 1 | Comp. Ex. 2 | Comp. Ex. 3 | Comp. Ex. 4 | Comp. Ex. 5 |
|---|---|---|---|---|---|---|
| Ultrahigh-molecular weight polyethylene (A) | part(s) by mass | 100 | 90 | 40 | 20 | — |
| Polymethylpentene (B) | part(s) by mass | — | 10 | 60 | 10 | 100 |
| Antioxidant | part(s) by mass | — | — | — | — | — |
| HDPE | part(s) by mass | — | — | — | 70 | — |
| 50 μm Penetration temperature by TMA | ° C. | 140 | 135 | 214 | 135 | 216 |
| Dispersed state  PE phase | — | continuous | continuous | discontinuous | continuous | — |
| PMP phase | — | — | discontinuous | continuous | discontinuous | continuous |

PE phase: phase derived from ultrahigh-molecular weight polyethylene (A)
PMP phase: phase derived from polymethylpentene (B)

The invention claimed is:

1. A polyolefin resin composition (C) comprising:
   (i) 85 to 50% by mass of ultrahigh-molecular weight polyethylene (A) having an intrinsic viscosity [η], as measured in decalin at 135° C. in accordance with ASTM D4020, of 3.5 to 35 dl/g, and
   (ii) 15 to 50% by mass of a copolymer (B) containing a repeating unit derived from 4-methyl-1-pentene and a unit derived from an α-olefin having 5 to 20 carbon atoms,
   in 100% by mass of the polyolefin resin composition (C).

2. The polyolefin resin composition (C) as claimed in claim 1, wherein the amount of the ultrahigh-molecular weight polyethylene (A) is in the range of 79 to 50% by mass and the amount of the copolymer (B) is in the range of 21 to 50% by mass, each amount being based on 100% by mass of the polyolefin resin composition (C).

3. The polyolefin resin composition (C) as claimed in claim 2, which is a composition for a microporous membrane.

4. A polyolefin composition for a microporous membrane, comprising the polyolefin resin composition (C) as claimed in claim 2 and a plasticizer.

5. A film obtained from the polyolefin resin composition (C) as claimed in claim 3.

6. A microporous membrane obtained from the polyolefin resin composition (C) as claimed in claim 3.

7. A battery separator obtained from the polyolefin resin composition (C) as claimed in claim 3.

8. A process for producing a microporous membrane, comprising extruding a polyolefin composition for a microporous membrane from a die, cooling the extrudate to form a sheet, stretching the sheet and then extracting the plasticizer to remove it, wherein the polyolefin resin composition (C) comprises:
   (i) 79 to 50% by mass of ultrahigh-molecular weight polyethylene (A) having an intrinsic viscosity [η], as measured in decalin at 135° C. in accordance with ASTM D4020, of 3.5 to 35 d/g, and
   (ii) 21 to 50% by mass of a copolymer (B) containing a repeating unit derived from 4-methyl-1-pentene and a unit derived from an α-olefin having 5 to 20 carbon atoms,
   in 100% by mass of the polyolefin resin composition (C), and wherein the polyolefin resin composition further comprises a plasticizer.

9. The polyolefin resin composition (C) as claimed in claim 1, which is a composition for a microporous membrane.

10. A polyolefin composition for a microporous membrane, comprising the polyolefin resin composition (C) as claimed in claim 1 and a plasticizer.

11. A film obtained from the polyolefin resin composition (C) as claimed in claim 9.

12. A film obtained from the polyolefin resin composition (C) as claimed in claim 2.

13. A film obtained from the polyolefin resin composition (C) as claimed in claim 1.

14. A microporous membrane obtained from the polyolefin resin composition (C) as claimed in claim 9.

15. A microporous membrane obtained from the polyolefin resin composition (C) as claimed in claim 2.

16. A microporous membrane obtained from the polyolefin resin composition (C) as claimed in claim 1.

17. A battery separator obtained from the polyolefin resin composition (C) as claimed in claim 9.

18. A battery separator obtained from the polyolefin resin composition (C) as claimed in claim 2.

19. A battery separator obtained from the polyolefin resin composition (C) as claimed in claim 1.

20. A process for producing a microporous membrane, comprising extruding a polyolefin composition for a microporous membrane from a die, cooling the extrudate to form a sheet, stretching the sheet and then extracting the plasticizer to remove it, wherein the polyolefin resin composition (C) comprises:
   (i) 85 to 50% by mass of ultrahigh-molecular weight polyethylene (A) having an intrinsic viscosity [η], as measured in decalin at 135° C. in accordance with ASTM D4020, of 3.5 to 35 dl/g, and
   (ii) 15 to 50% by mass of a copolymer polymer (B) containing a repeating unit derived from 4-methyl-1-pentene and a unit derived from an α-olefin having 5 to 20 carbon atoms,
   in 100% by mass of the polyolefin resin composition (C), and wherein the polyolefin resin composition further comprises a plasticizer.

* * * * *